Sept. 2, 1969  A. ABRAHAM  3,464,427

DRESSING COMB MADE OF PLASTIC MATERIAL

Filed April 11, 1968  2 Sheets-Sheet 1

INVENTOR.
Anton Abraham
BY Ernest F. Marmorek
attorney

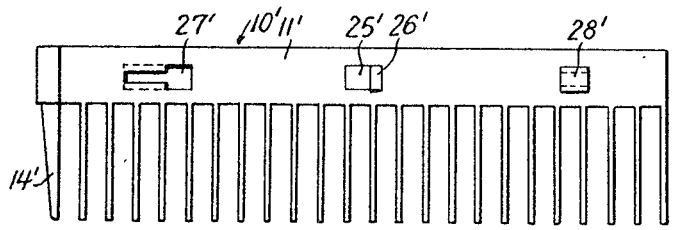
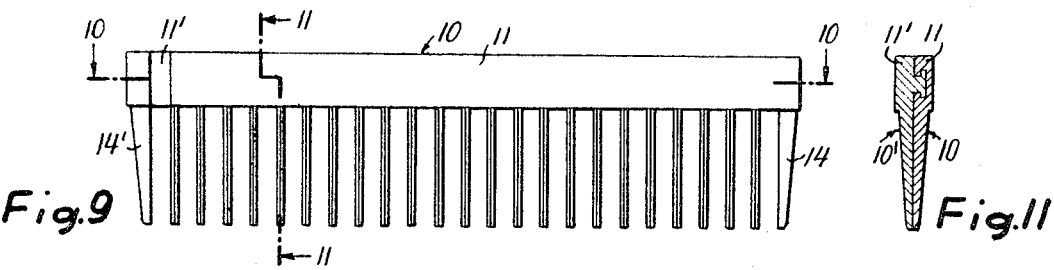
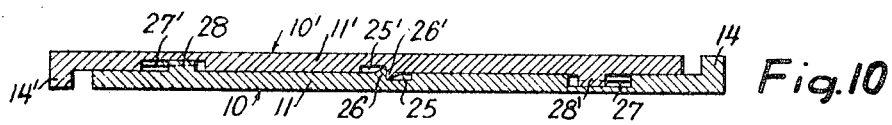
Fig. 8
Fig. 9
Fig. 11
Fig. 10

United States Patent Office 3,464,427
Patented Sept. 2, 1969

3,464,427
DRESSING COMB MADE OF PLASTIC MATERIAL
Anton Abraham, Perchtoldsdorf, Austria, assignor to Wiener Kammfabrik Anton Abraham Komm. Ges. Wiener Neudorf, Austria, a corporation of Austria
Filed Apr. 11, 1968, Ser. No. 720,526
Claims priority, application Austria, June 16, 1967, A 5,620/67
Int. Cl. A45d 24/04
U.S. Cl. 132—136           2 Claims

ABSTRACT OF THE DISCLOSURE

A plastic dressing comb comprising two superimposed comb plates movable relative each other to adjust the width of the gaps between the teeth. Each plate has an abutting back frame provided with separable connecting and guiding means for the relative longitudinal movement. Each comb plate includes a single enlarged terminal tooth at only one end, which tooth is wider than the back with the set of teeth and protrudes on one side from the inner side of the back.

---

The present invention relates to a dressing comb made of plastics material consisting of two superposed comb plates, which can be moved against each other to change the width of the gaps between the teeth.

A twin comb, whose comb plates are movable in the lengthwise direction, is already known in the art. The comb plates are connected by joints provided with pull-out bolts so that the plates may be either opened or moved against each other. When shut the two comb plates adjoin loosely and thus have to be held together by the fingers during combing. Since each comb plate has to be compact by itself, each has to be of the width of a conventional comb so that the twin comb is twice as wide as a conventional comb, whereby it becomes heavier and bulkier and more difficult to handle. Furthermore, the exterior appearance of the twin comb is negatively affected since the joints are located on the surface of the twin comb on its upper edge, which moreover constitutes a disadvantage because hair may be caught and torn by the joints during combing. The application of the joints also involves a further stage in the production of the twin comb.

It is the object of the present invention to provide a dressing comb of the type initially described and to avoid the disadvantages stated above. The present invention is characterized in that the back frames of the comb plates are provided with separable connecting and guiding means for the two comb plates at their superposed back surfaces, e.g. deepened longitudinal slots and headed pins engaging in these slots, and that each comb plate is provided with an enlarged terminal tooth only at one of its ends, whereby this tooth is wider than the back with the set of teeth and protrudes on one side from the inner surface of the back. By connecting the comb plates a stable unit is obtained, and therefore the total width of the dressing comb need not exceed that of a conventional comb, which also is provided with only one enlarged tooth at either end. The parts of the combs can be produced by extrusion. By arranging the connecting and guiding means on the superposed back surfaces of the two comb plates these means are kept away from the hair so that the hair cannot be caught by them.

An advantageous embodiment of the invention where the connecting and guiding means are covered, i.e. they cannot be seen from the outside, is characterized in that the connecting and guiding means consist of bayonet joints in the form of carved-out recesses and offset connecting bolts on either comb plate provided on the inner sides of the superposed backs of the comb plates, and that the inner sides of the backs are also provided with a longitudinal recess and a stop engaging in it to limit the movement of the plates against each other.

Figure 1:
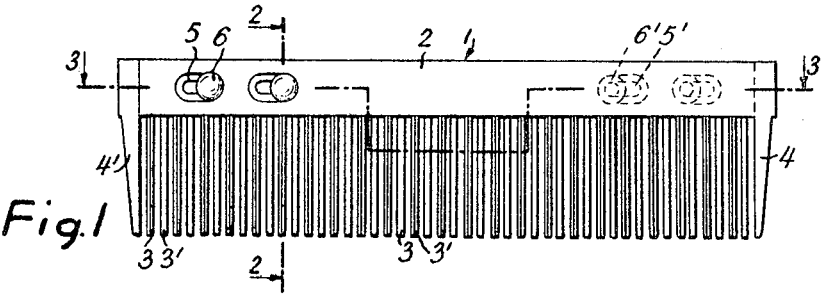
Figure 2:
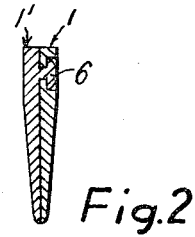
Figure 3:
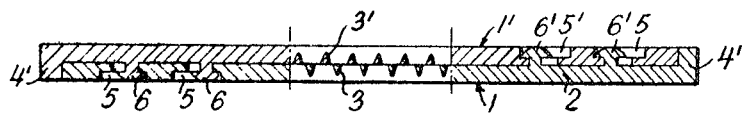
Figure 4:
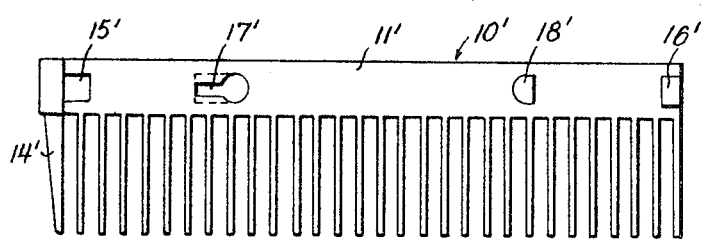
Figure 5:
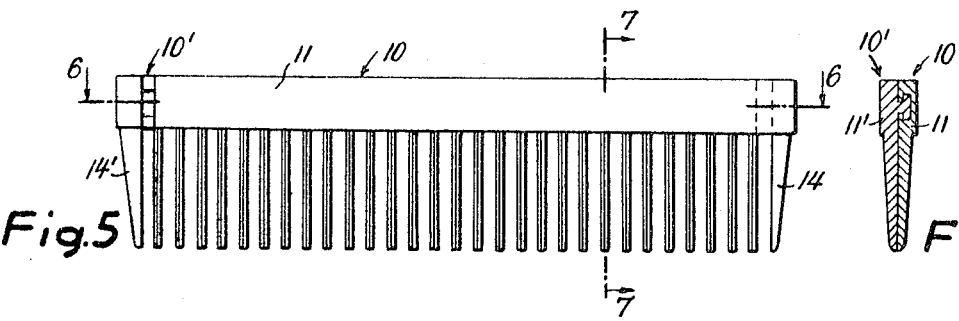
Figure 7:
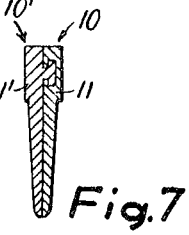
Figure 6:
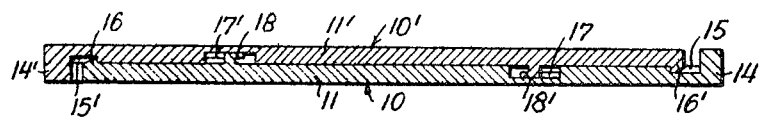

In the drawings embodiments of the invention are shown by way of example. FIGS. 1 to 3 show one embodiment of the dressing comb, with FIG. 1 being a front elevation showing the set of teeth slightly shifted against each other and FIGS. 2 and 3 being sectional views along the lines II—II, III—III respectively of FIG. 1. FIGS. 4 to 7 show another embodiment of the invention, whereby the connecting and guiding means are covered, with FIG. 4 being a front elevation of the inner side of the comb plate, FIG. 5 being a front elevation of the two congruently superposed comb plates and FIGS. 6 and 7 being sectional views along the lines VI—VI and VII—VII respectively of FIG. 5. FIGS. 8–11 show still another embodiment of the invention which is similar to the embodiment shown in FIGS. 4–7, with FIG. 8 being a front elevation of the comb plate, FIG. 9 being a front elevation of the two congruently superposed comb plates and FIGS. 10 and 11 being sectional views along the lines X—X and XI—XI respectively of FIG. 9.

Accrodingly to FIGS. 1 to 3 the dressing comb consists of two equal comb plates 1, 1' which lay upon each other with their longitudinal backs 2, 2' in a mirror reverse arrangement, whereby the sets of teeth 3, 3' of each plate are parallel to each other, and can be adjusted against each other by moving the comb plates along the areas of their superposed backs in order to provide the desired width of gap between the teeth of the dressing comb.

In contrast to conventional combs, which are provided with an enlarged terminal tooth on either end, the dressing comb according to the present invention is provided with only one such tooth per comb plate, which is twice as wide as the back from which it protrudes on one side (FIG. 3). The terminal tooth of comb plate 1 is indicated with numeral 4 and that of comb plate 1' is indicated with numeral 4'. Thus in case of a dressing comb consisting of superposed and mirror reverse comb plates 1, 1' the terminal teeth of the dressing comb are provided by the two comb plates. The backs 2, 2' are provided with deepened longitudinal slots 5, 5' and headed pins 6, 6', to guide and connect the two comb plates 1, 1', whereby these slots and pins are provided in such a manner that the pins of the one plate engage in the slots of the other plate in the case of superposed comb plates in a mirror reverse arrangement. It is suitable for the heads of the pins to fit into the slots in order not to project above the plate.

In case of dressing combs made of plastics material the pins 6, 6' are welded to the back 2, 2' and the heads of the pins, which form the connection between the two comb plates, are shaped by heat. It is also possible to use metal rivets.

The connection between the two comb plates should be so tight as to cause a certain amount of friction so that they do not move while the dressing comb is used. However, there may also be some type of securing, as e.g. a screw.

According to FIGS. 4 to 7 the dressing comb consists also of two equal comb plates 10, 10', as in the case of the dressing comb shown in FIGS. 1 to 3. In this case bayonet joints instead of longitudinal slots and pins are provided on the inner sides of the superposed backs 11, 11' for connecting and guiding, and the recesses 15, 15' as well as the stops 16, 16' are also provided on the inner sides of the backs to limit the shifting movement. The bayonet joint consists of carved-out longitudinal recesses 17, 17', a longitudinal slot extending into an enlarged round section, and a bolt 18, 18' with an enlarged head engaging in the slot. The stop limits the movement of the comb plates against each other in order to prevent the head of the bolt from arriving in the enlarged section which would dissolve the connection of the arresting mechanism. When taking apart the comb plates one comb plate may be raised, which is possible on account of the elasticity of the plastics material, in order to unhinge stops 16 or 16' from recesses 15 or 15' so that the comb plate may then be shifted again, opening the bayonet joint.

In contrast to FIGS. 1 to 3 the connecting and guiding of the dressing comb, since they are provided on the inner sides of the comb plates, thereby improving the exterior appearance of the dressing comb.

Since comb plates 1, 1' as well as comb plates 10, 10' are of the same structure, only one mould is necessary for the production of the comb plates 10, 10' and 1, 1'.

The terminal teeth of the plates 10, 10' correspond to the terminal teeth 4, 4' of FIGS. 1 to 3 and are indicated with numerals 14, 14'. The stop and the corresponding recess may also be provided at another location, e.g. between the two parts of the bayonet joint in the center of the dressing comb.

The embodiment according to FIGS. 8–11 is similar to that of FIGS. 4–7, thus the corresponding parts are indicated with the same numerals.

According to FIGS. 8–11 the differences lie in the shape of the connecting bolts 28, 28', since they are provided with a square head, and in the corresponding recesses 27, 27', since accordingly their enlarged sections are also square. Furthermore, the stops, which limit the movement of the comb plates against each other, are provided in the center of the comb plates between the bayonet joints, whereby the recesses are indicated with numerals 25, 25' and the stops are indicated with numerals 26, 26'.

The teeth of each set of teeth may be of any form and cross-sectional shape. As is already known in the art the teeth of one set of teeth may be shorter than in the other set, in order to bring about certain effects and/or the ends of the teeth may either show two or more indentations or they may be enlarged in the shape of a drop. Furthermore, it is also possible to use a more elastic material for the one set than for the other, and thus the comb may be used almost like a brush.

I claim:
1. A dressing comb of plastics material comprising two identical and complementary superposed comb plates each including teeth and each slidably disposed contiguously against each other at contiguous surfaces thereof to change the width of the gaps between the teeth,
each of said two comb plates comprising back frames having separable connecting and guiding means on its superposed contiguous surface, said means comprising first longitudinal recess means and bolt means, said bolt means of each of said two comb plates engaging in and slidably fitting into said first longitudinal recess means of the other of said two comb plates, and
each of said two comb plates having an enlarged terminal tooth only at one of its ends and doubly wider than said back frame and projecting to one side toward the other of said two comb plates from said contiguous surface of its back frame, thereby substantially enclosing the corresponding end of said other of said two comb plates.

2. The dressing comb, as set forth in claim 1, wherein said connecting and guiding means comprise bayonet joints forming carved-out recesses and offset connecting bolts on each of said comb plates on said contiguous surfaces of the superposed comb plates, said contiguous surfaces of each of said back frames of said two comb plates being formed with a cooperative second longitudinal recess means and a stop means, the latter of each of said two comb plates engaging in said second longitudinal recess means of the other of said two comb plates for limiting the longitudinal movement of said two comb plates against each other.

References Cited
UNITED STATES PATENTS

| | | | |
|---|---|---|---|
| 2,463,893 | 3/1949 | Marini | 132—136 |
| 2,626,618 | 1/1953 | Collison | 132—136 |

FOREIGN PATENTS

| | | |
|---|---|---|
| 5,413,316 | 7/1922 | France. |
| 25,339 | 3/1952 | Finland. |
| 494,341 | 7/1953 | Canada. |

LOUIS G. MANCENE, Primary Examiner

JAMES W. MITCHELL, Assistant Examiner